UNITED STATES PATENT OFFICE.

PAUL DEEGENER AND WILHELM BERNDT, OF BERLIN, GERMANY.

PROCESS OF PRESERVING ANIMAL OBJECTS.

1,163,645.  Specification of Letters Patent.  Patented Dec. 14, 1915.

No Drawing.  Application filed May 16, 1914.  Serial No. 839,133.

*To all whom it may concern:*

Be it known that we, PAUL DEEGENER and WILHELM BERNDT, residing at Berlin, Germany, have invented certain new and useful Improvements in Processes of Preserving Animal Objects, of which the following is a specification.

Our invention relates to improvements in the process of preserving animals and making anatomical preparations, and the product obtained thereby, and more particularly in the process in which the objects are preserved by mummification, and which is particularly useful in preserving small animals which can not be stuffed, and anatomical preparations.

For the purpose of maintaining the natural form of the objects and producing a transparency which is not found in the natural objects, parts of animals have heretofore been preserved by fixing and dehydrating the same, and thereafter inclosing the same in a block of transparent material. According to another process such objects have been dehydrated by means of alcohol, and thereafter imbued with and kept within suitable organic liquids of a suitable refractive index, in order to render the same transparent. Finally volatile organic solvents and a hard fat (wax, resin) have been used as impregnating media for making flexible mummies of plants. This process is not suitable for treating animal objects, because the preparations obtained thereby are sticky, glutinous, and dirty at their surfaces, as long as the volatile oil is present which is used in order to obtain flexible objects. As the mixture of oil and fat can not be thoroughly removed from the surface, the latter loses in fineness or distinctness of the structure, scales,—little warts, callosity, and ribs. Besides the objects do not last. After some time, by the vaporization of the volatile oil fine cavities are formed below the surface, and more particularly below the scales, and in the fin rays. Thereby white or silvery stripes and bolts are produced which impair the quality of the object.

The object of the improvements is to provide a process in which these objectionable features are avoided, and which permits the preservation, of small amphibies, fishes, worms, and other animals which are naked and have a soft skin, and which can not be preserved in a dry state as insects, or by stuffing, as hairy or feathery animals, the preservation being carried out in such a way, that the objects are kept in a dry state and in any natural position, form, or color.

With this object in view our improved process consists in first subjecting the animals or anatomic preparations and the like to a hardening process such as is known in preparing individual cells and cell tissues for microscopic examination, thereupon dehydrating the same, and finally impregnating the same with a suitable substance.

In carrying out our improved process we prefer to proceed in the following way: The whole body of the animal is first brought into the desired position which corresponds to natural conditions, whereupon it is treated for hardening with mercuric chlorid, and dehydrated according to known methods, for example by putting the same successively into alcohol baths of increasing concentration. Thereupon it is placed into a bath of a volatile hydrocarbon, such for example as xyhol, or chloroform. Thereupon it is put into a bath of warm and liquid paraffin, and thereafter into a mixture of three parts of paraffin and one part of a light resin such as *colophonium citricum*. After the body of the object has been thoroughly saturated the superfluous mass is allowed to flow off, and the product is allowed to cool.

By saturating the object with a substance of the character described the milky-opaque, half transparent appearance of the muscles of fishes, amphibies, and the like is perfectly imitated in the dry preparation. The glutinous-transparent brilliancy of the coating of the skin of the fishes and amphibies can be imitated if desired by painting the same with a suitable paint, such for example as resin alcohol lacquer.

Our improved process is also suitable for making anatomic preparations. The form is fully preserved, and also the colors are well kept, the character of the color, whether dark, light, marbled, figured, or veined, being distinctly visible. Very bright colors can be freshed up.

Our improved process is particularly advantageous in making anatomic preparations, because it is not necessary to keep the preparations in clumsy receptacles, and they can be taken by the hand so as to allow easy demonstration as is particularly desirable for the purpose of schools.

In our improved preparations all the details can be indicated and a misunderstanding is impossible.

We claim herein as our invention:

1. The herein described process of preserving small animals and making anatomic preparations, which consists in hardening the objects to be preserved, dehydrating the same, saturating the same with volatile hydrocarbon, and impregnating the same with an impregnating medium which is liquid when in a hot state and hard when at normal temperature.

2. The herein described process of preserving small animals and making anatomic preparations, which consists in hardening the objects to be preserved by means of mercuric chlorid, dehydrating the same by means of alcohol, saturating the same with volatile hydrocarbon, and impregnating the same with a mixture of paraffin and a light resin.

3. The herein described preparation, which consists of a dehydrated and hardened object of animal nature saturated with an impregnating medium which is liquid at an elevated temperature and hard at a normal temperature.

In testimony whereof we affix our signatures in presence of two witnesses.

PAUL DEEGENER.
WILHELM BERNDT.

Witnesses:
WOLDEMAR HAUPT,
HENRY HASPER.